United States Patent [19]
Spector

[11] Patent Number: 6,017,049
[45] Date of Patent: *Jan. 25, 2000

[54] INTERACTIVE SAFETY HELMET FOR BICYCLISTS

[76] Inventor: Donald Spector, 380 Mountain Rd., Union City, N.J. 07080

[*] Notice: This patent is subject to a terminal disclaimer.

[21] Appl. No.: 08/958,339

[22] Filed: Oct. 27, 1997

Related U.S. Application Data

[63] Continuation-in-part of application No. 08/827,949, May 2, 1997, Pat. No. 5,842,714.

[51] Int. Cl.$^7$ ....................................................... B62H 1/00
[52] U.S. Cl. ............................... 280/288.4; 2/425; 2/906; 455/568
[58] Field of Search .......................... 280/288.4; 455/97, 455/466, 568; 2/410, 422, 425, 905, 906; 362/103, 105, 106

[56] References Cited

U.S. PATENT DOCUMENTS

| | | | |
|---|---|---|---|
| 2,904,645 | 9/1959 | Sarles | 179/171 |
| 4,814,951 | 3/1989 | Larsen | 362/72 |
| 5,329,637 | 7/1994 | Walker | 2/5 |
| 5,438,702 | 8/1995 | Jackson | 455/89 |
| 5,590,209 | 12/1996 | Pratt | 381/168 |

Primary Examiner—Chris Schwartz
Assistant Examiner—C. T. Bartz
Attorney, Agent, or Firm—Michael Ebert

[57] ABSTRACT

An interactive safety helmet for a bicyclist, making it possible for a group of bicyclists wearing like helmets to communicate with each other and thereby coordinate their activities. The helmet is formed by an outer shell shaped to fit onto the head of the bicyclist and an inner cushioning liner having a pair of miniature loud speakers embedded therein at opposing sides adjacent the ears of the bicyclist. Extending from the shell is a gooseneck supporting a microphone at a position adjacent the mouth of the bicyclist. Mounted on the shell is a miniature radio transceiver whose transmitter section is coupled to the microphone and whose receiver section is coupled to the loud speakers. The transceiver is connected by a line extending from the helmet to an external battery power pack. In operation, a bicyclist wearing the helmet can by talking into the microphone and listening to the loud speakers interact with other bicyclists in the group. The helmet is also provided on either side thereof with an LED safety flashing light powered by the same power pack.

12 Claims, 2 Drawing Sheets

INTERACTIVE SAFETY HELMET FOR BICYCLISTS

RELATED APPLICATIONS

This application is a continuation-in-part of my copending application Ser. No. 08/827,949, filed May 2, 1997 entitled "Bicycle Power Pack."

This application issued on Dec. 1, 1998 as Spector U.S. Pat. No. 5,842,714.

BACKGROUND OF THE INVENTION

1. Field of Invention

This invention relates generally to a safety helmet for bicyclists, and more particularly to a safety helmet that is interactive with like helmets, making it possible for a group of bicyclists wearing these helmets to communicate with each other and thereby coordinate their activities.

2. Status of Prior Art

In my above-identified copending patent application, there is disclosed a bicycle having incorporated in its frame a battery power pack for supplying operating power to bicycle accessories, such as head and tail lights. The bicycle power pack is also capable of supplying power to a safety helmet worn by a bicyclist, the helmet being equipped with a radio and safety lights.

Because the power supply for the helmet is external thereto, the helmet is not weighed down by batteries and can be comfortably worn by the bicyclist. And because the safety lights and the radio included in the helmet are without batteries, they are highly compact and add little weight to the helmet.

The safety helmet disclosed in my copending patent application, though protective of a bicyclist's head, does not take into account the fact that bicyclists often travel in groups, very much in the manner of motorcyclists who belong to a motorcycle club. When travelling in a group, bicyclists need to be able to communicate with each other in order to coordinate their activities.

Thus when a group of young bicyclists are travelling together toward a camping site in a state park many miles from their city homes, it is essential, especially in the hours when the bicyclists are travelling on unlighted roads, that the bicyclists keep in touch with each other. The bicyclists in the group usually travel one behind the other on the road with a spacing between successive bicyclists that depends on how fast each bicyclist can pedal. It is important that no bicyclist in the group fall so far behind the others that he becomes separated from the group.

The present practice for coordinating the activities of a group of bicyclists is by hand signals. These leave much to be desired, for some bicyclists in the group may be beyond the range in which these hand signals can be seen. Also the visibility of hand signals depends on ambient light conditions.

Also important to the safety of a bicyclists are safety lights which call attention to the bicycle and the direction in which it is travelling. Bicycles which travel at night are equipped with head and tail lights, one usually being attached to the handle bar and the other to the rear fender. But these lights may escape the attention of driver's in motorized vehicles approaching the front or rear end of the bicycle. Thus a driver in the elevated cab of a large truck is positioned well above the level of a bicycle and may therefore fail to see light rays emanating from safety lights on the bicycle close to the road.

On the other hand, safety light placed on a helmet worn by the bicyclist are at a higher level and therefore are more visible to the drivers of approaching vehicles. But when such lights are produced by incandescent light bulbs, the greater their intensity the more power they require, and if this power is provided by batteries housed in the helmet, the batteries then add excessive weight to the helmet.

In signal light units included in a helmet in accordance with the invention, light flashes are emitted by LED'S. Of prior art interest is the Choi et al. U.S. Pat No. 5,313,187 which discloses superluminescent LED's driven by a low-frequency oscillator to produce light flashes at a frequency of 3½ pulses a second to serve as a flashing light warning device on a bicycle.

SUMMARY OF INVENTION

In view of the foregoing the main object of this invention is to provide an interactive safety helmet for a bicyclist which makes it possible for a group of bicyclists, each wearing a like helmet, to coordinate their activities.

More particularly, an object of this invention is to provide an interactive helmet for a bicyclist having incorporated therein a miniature radio transceiver functioning as a walkie-talkie, power to which is supplied by an external power pack coupled by a line to the helmet whereby the safety helmet which protects the head of its wearer is relatively light-weight and comfortable to wear.

A significant advantage of an interactive helmet in accordance with the invention is that it is free of batteries, and the external power pack which supplies power to the walkie-talkie and other electrically-powered units in the helmet has a large power capacity, being capable therefore of energizing the helmet for a prolonged period.

Also an object of the invention is to provide an interactive helmet of the above type in which embedded in a cushioning layer of the helmet are a pair of miniature loud speakers at positions adjacent the ears of the bicyclist and in which a microphone supported on a gooseneck extending from the helmet is positioned adjacent the mouth of the bicyclist, the microphone and loud speakers being coupled to the transceiver mounted on the helmet whereby the bicyclist when operating the transceiver can talk into the microphone and listen to the loudspeakers.

Yet another object of this invention is to provide an interactive safety helmet of the above type having safety light units mounted on opposite sides of the helmet, each unit including a cluster of LED's which are powered by the same external power pack to produce periodic strobe-like light flashes.

Briefly stated, these objects are attained by an interactive safety helmet for a bicyclist, making it possible for a group of bicyclists wearing like helmets to communicate with each other and thereby coordinate their activities. The helmet is formed by an outer shell shaped to fit onto the head of the bicyclists and an inner cushioning liner having a pair of miniature loud speakers embedded therein at opposing sides adjacent the ears of the bicyclist. Extending from the shell is a gooseneck supporting a microphone at a position adjacent the mouth of the bicyclist.

Mounted on the shell is a miniature radio transceiver whose transmitter section is coupled to the microphone and whose receiver section is coupled to the loud speakers; the transceiver being connected by a line extending from the helmet to an external battery power pack. In operation, each bicyclist wearing the helmet can by talking into the microphone and listening to the loud speakers interact with other bicyclists in the group. The helmet is also provided Ion either side thereof with an LED flashing safety light powered by the same power pack.

BRIEF DESCRIPTION OF INVENTION

For a better understanding of the invention as well as other objects and further features thereof, reference is made to the following detailed description to be read in conjunction with the accompanying drawings, wherein.

DESCRIPTION OF INVENTION

Figure 1:
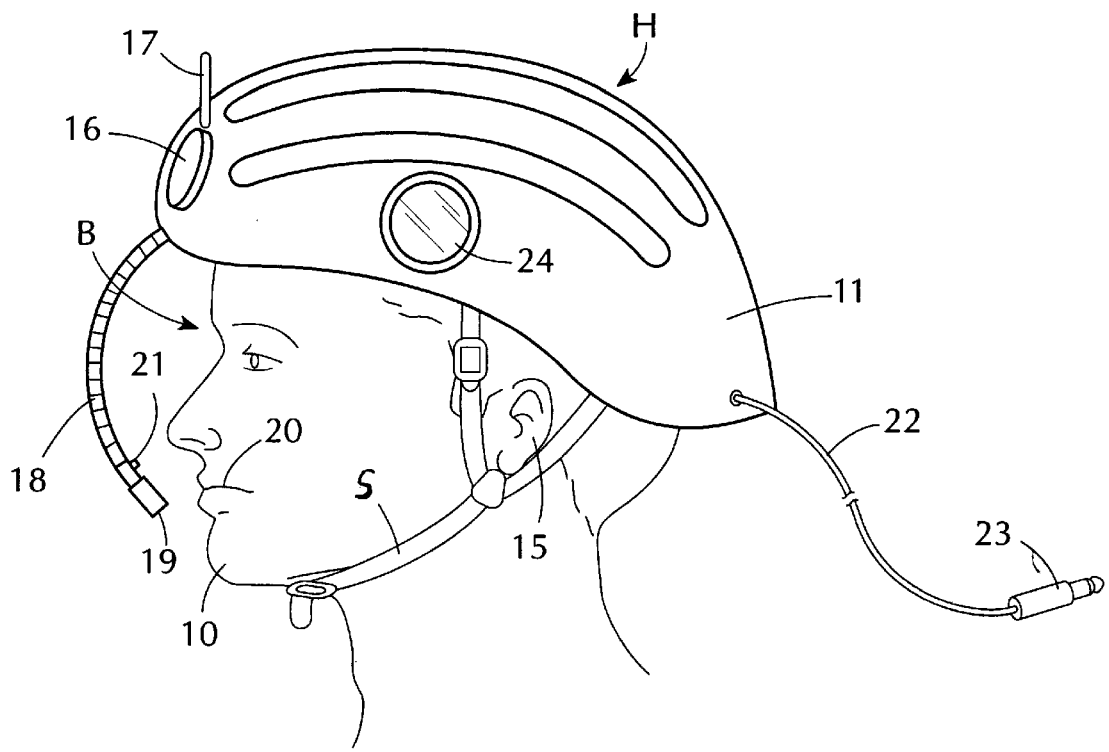
FIG. 1 illustrates in side view an interactive safety helmet in accordance with the invention worn on the head of a bicyclist.
Figure 2:
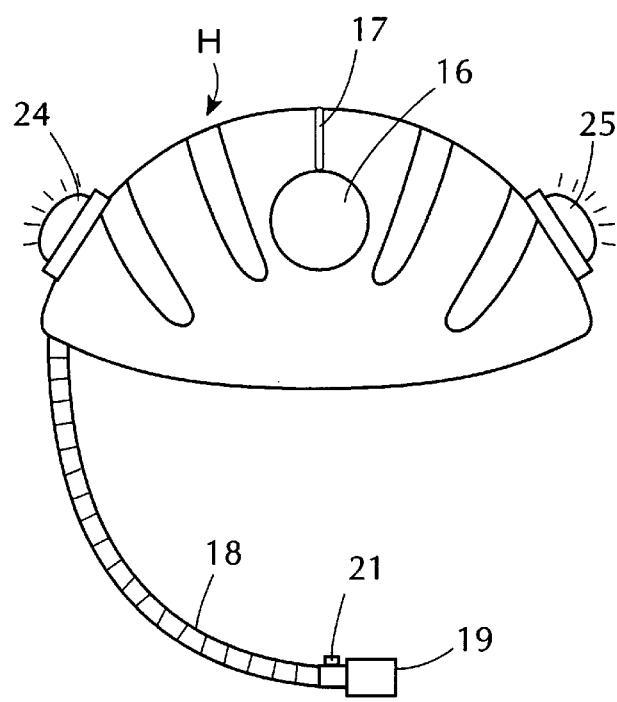
FIG. 2 is a front view of the safety helmet.
Figure 3:
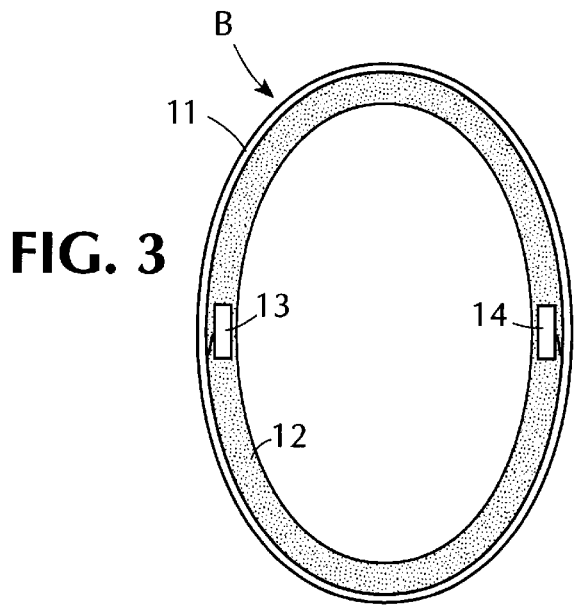
FIG. 3 is a plan view showing the interior of the helmet.

Shown in FIGS. 1 to 3 is a helmet H in accordance with the invention worn on the head 10 of a bicyclist. The helmet is strapped by straps S onto the chin of the wearer so that it remains securely in place even as the head of the bicyclist is agitated in the course of travel or strikes the ground should the bicyclist fall off his bicycle.

Helmet H is formed by an outer shell 11 which is shaped to fit onto the head of the bicyclists, the shell being molded of high-strength synthetic plastic material, such as polycarbonate or polypropylene which may be reinforced by fiberglass. The interior of shell 11 is lined with a layer 12 of cushioning material, such as flexible polyurethane foam.

Embedded in cushioning layer 12 on opposite sides thereof and effectively floating therein is a pair of miniature loud speakers 13 and 14 which are placed so as to be adjacent the ears 15 of the wearer of the helmet.

Mounted on the front end of shell 11 at its center and projecting therefrom is a circular dome housing a compact microwave transceiver 16 provide with a short antenna 17. Transceiver 16, in its transmission mode, sends out a transmitted signal having a radio-frequency carrier which is picked up by the receiver of another transceiver tuned to this carrier. And transceiver 16, in its receiving mode picks up the signal transmitted by the other transceiver.

The miniature transceiver 16 carried by helmet H is a solid-state transistorized microwave radio transmitter and receiver combined into a single compact unit having a switching arrangement to permit common use of transistors included in the unit both in the transmitting and receiving modes. A transceiver which combines a transmitter section with a receiver section is often referred to as a pack unit and is popularly known as a walkie-talkie. In order for the transceiver to send out a voice message to be picked up by a like transceiver, it must be provided with a microphone coupled to the transmitter section into which the user talks, and in order for the user to hear the voice message the receiver section of the transceiver must be coupled to earphones or loud speakers.

Anchored on helmet H and extending therefrom is a tubular gooseneck 18 which is a bendable pipe which can be bent to assume any desired curvature. Supported at the end of gooseneck 18 is a tiny microphone 19 connected to the transmitter section of transceiver 16 by a cable passing through the gooseneck. When the helmet is placed on the head of the bicyclist, the gooseneck is then shaped to position microphone adjacent the mouth 20 of the cyclist.

The loud speakers 13 and 14 in the helmet are connected to the receiver section of the transceiver by wires embedded in liner 12. Also mounted on gooseneck 18 adjacent microphone 19 is a control switch 21 operated by the hand of the bicyclist to switch the transceiver from a transmission to a receiving mode and vice versa, as is necessary when using the transceiver as a walkie-talkie to communicate with another bicyclist wearing a similar helmet. Switch 21 whose line connecting the switch to the transceiver runs through the gooseneck includes a neutral position at which the transceiver is disconnected from its external power supply and is therefore turned off.

There are no batteries included in transceiver 16, for power is supplied thereto by a line 22 extending from the rear of the helmet to a plug 23 that plugs into an external battery pack. The power pack may be incorporated in the frame of the bicycles, as in the above-identified copending application, or it may be strapped to the waist of the bicyclist. Because the battery power source for the helmet is external thereto it does not weigh down the helmet.

Also powered by the same external power pack through line 22 are right and left safety light units 24 and 25 mounted on opposite sides of the helmet, the right unit preferably producing a green light and the left unit a red light.

Thus one who sees the red and green safety lights on the helmet at night but not seeing the bicyclist is informed as to the orientation of the bicyclist who generally rides on the right side of the road, this being indicated by a green light. The light units 24 and 25 preferably make use of LED's rather than incandescent light bulbs, for though LED's draw little current, they produce a bright green or red light.

A light-emitting diode, generally identified as an LED, is a rectifying semiconductor which converts electrical energy applied thereto to light whose color depends on the material from which the diode is made. Thus when a D-C voltage is applied to a gallium-arsenide LED, light having a green color is produced, whereas a gallium-arsenide-phosphate LED produces a red color while a silicon-carbide LED yields a yellow color.

Figure 4:
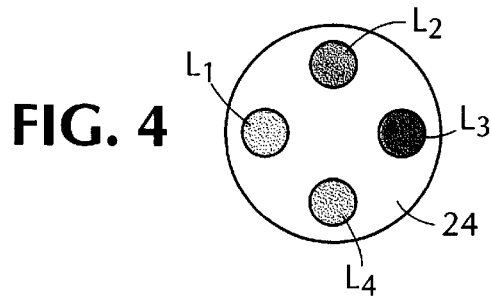
FIG. 4 shows an array of LED's in one of the safety light units.

A standard LED operates at 3 volts D-C, hence to operate LED's from a 6 volt power supply, two LED's are connected in series. And if an LED light unit, such as unit 24 shown in FIG. 4 is composed of a cluster of four LED's $L_1$, $L_2$, $L_3$ and $L_4$, then to operate this cluster at 6 volts, LED's $L_1$ and $L_2$ are connected in series in parallel relation to LED's $L_3$ and $L_4$ connected in series. Hence applied to each LED in the cluster of four LED's is 3 volts D-C.

Figure 5:
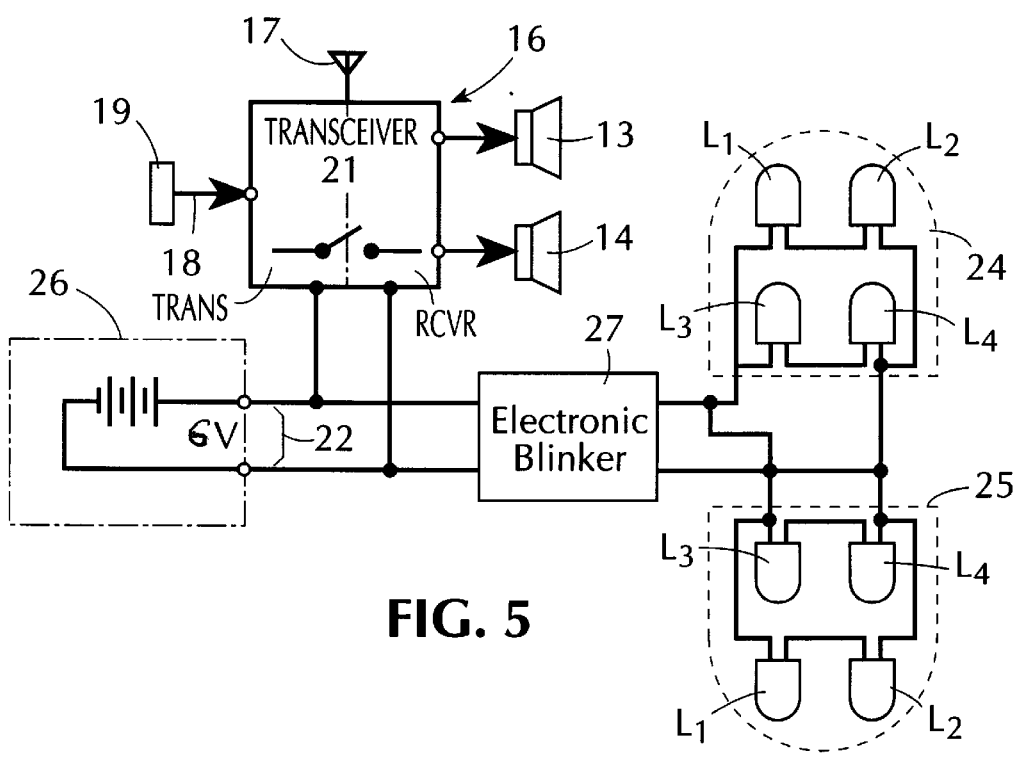
FIG. 5 is a wiring diagram of the safety light units and the transceiver coupled to an external power pack.

FIG. 5 illustrates the manner in which transceiver 16 and LED light units 24 and 25 mounted in helmet H are energized through line 22 extending from the helmet by an external D-C power pack 26 formed by four battery cells connected in series, each cell having a 1.5 volt output. Hence power pack 26 has a 6 volt output. Power pack 26 which is external to the helmet may be incorporated in the frame of a bicycle, as disclosed in my copending patent application, or be strapped onto the waist of the bicyclist, or if the bicyclist is wearing a back pack, the power pack may be placed therein.

Transceiver 16 which operates at 6 volts to whose transmitter section microphone 19 is connected and to whose receiver section loudspeakers 13 and 14 are connected, is directly connected to the 6 volt power supply 26.

But LED light units 24 and 25 are not directly connected to the power supply, for interposed between the power supply and these units is a solid state electronic blinker 27 which includes a pulse generator to periodically interrupt the power supply to produce brief voltage pulses for activating the LED units. As a consequence, the LED light units yield light flashes of high intensity at a rate of 5 to 10 per second, very much like strobe lights.

Thus when a group of bicyclists are travelling on a dark road one behind the other, all wearing a helmet H, each bicyclist is able, by means of the walkie-talkie mounted on the helmet, to communicate with the bicyclists and in this way coordinate the activities of the group. The operating range of the walkie-talkie may be relatively short, for long range communication is usually unnecessary.

The red and green light flashes radiating from opposite sides of the helmet not only call attention to the presence of a bicyclist on the road and his orientation, but also at night produce a Space Age effect. One observing at night an approaching train of bicyclists, each wearing a helmet H flashing red and green light rays in opposite directions which swing as the bicyclist turns his head, may then gain the impression of being invaded by aliens from outer space.

Because the LED light clusters, despite their high light intensity, draw relatively little current, and the transistorized transceiver also draws little current a battery power pack using D cells is capable of powering the helmet for a prolonged period.

While there has been shown a preferred embodiment of an interactive safety helmet for bicyclists in accordance with the invention, it is to be appreciated that many changes may be made therein without departing from the spirit of the invention.

I claim:

1. An interactive safety helmet for a bicyclist, making it possible for two or more bicyclists wearing like helmets to communicate with each other and thereby coordinate their activities, said helmet comprising:

A. an outer shell shaped to fit onto the head of the bicyclist and having an inner liner;

B. a miniature microwave transceiver mounted on the exterior of the shell provided with a transmitter section and a receiver section to function as a walkie-talkie, said transceiver being provided with an antenna that extends therefrom, said transceiver having a predetermined D-C operating voltage;

C. a line extending from the helmet to connect the transceiver to an external power supply having an output voltage corresponding to said operating voltage;

D. a microphone connected to said transmitter section extending from the shell to assume a position adjacent the mouth of the bicyclist;

E. at least one miniature loudspeaker connected to said receiver section mounted within said shell and embedded in said liner at a position adjacent an ear of the bicyclist whereby by talking into the microphone and listening to the loudspeaker, the bicyclist can communicate with other bicyclists.

2. A safety helmet, as set forth in claim 1, in which the external power supply is a battery power pack incorporated in the frame of the bicycle driven by the bicyclist.

3. A safety helmet as set forth in claim 1, in which the shell is molded of high-strength synthetic plastic material.

4. A safety helmet as set forth in claim 3, in which the plastic material is polypropylene.

5. A safety helmet as set forth in claim 1, in which the helmet is provided with an inner cushioning layer in which said loud speaker is embedded.

6. A safety helmet as set forth in claim 5, in which the cushioning layer is formed by a flexible synthetic plastic foam.

7. A safety helmet as set forth in claim 6, in which a pair of loudspeakers are embedded in the foam layer on opposite sides of the helmet.

8. A safety helmet as set forth in claim 1, in which mounted on opposite sides of the shell are signal light units, each being powered through said line by said external power supply.

9. A safety helmet as set forth in claim 8, in which each signal light unit is formed by a cluster of LED's which are so connected as to be energized by the output voltage of the power supply.

10. A safety helmet as set forth in claim 9, in which each light unit is connected to said power supply through an electronic blinker whereby the unit produces periodic light flashes.

11. A safety helmet is set forth in claim 10, in which the LEDs in one unit produce a red light and those in the opposite unit produce a green light.

12. A safety unit as set forth in claim 1, in which the microphone is extended from the shell by a gooseneck which is bendable to position the microphone adjacent the mouth of the bicyclist.

* * * * *